(12) United States Patent
Keiser

(10) Patent No.: US 7,971,854 B2
(45) Date of Patent: Jul. 5, 2011

(54) REPLACEABLE VALVE SHAFT SEALING SYSTEM

(75) Inventor: David B Keiser, Westminster, CA (US)

(73) Assignee: Griswold Controls Inc, Irvine, CA (US)

( * ) Notice: Subject to any disclaimer, the term of this patent is extended or adjusted under 35 U.S.C. 154(b) by 168 days.

(21) Appl. No.: 12/236,447

(22) Filed: Sep. 23, 2008

(65) Prior Publication Data

US 2009/0079138 A1    Mar. 26, 2009

Related U.S. Application Data

(60) Provisional application No. 60/974,674, filed on Sep. 24, 2007.

(51) Int. Cl.
*F16K 41/04* (2006.01)

(52) U.S. Cl. ......... 251/214; 251/355; 277/512; 277/529

(58) Field of Classification Search .............. 251/214, 251/315.01, 355; 277/512, 529
See application file for complete search history.

(56) References Cited

U.S. PATENT DOCUMENTS

| | | | | |
|---|---|---|---|---|
| 1,502,734 | A * | 7/1924 | Trevillie | 251/214 |
| 3,204,970 | A * | 9/1965 | Dickinson | 251/214 |
| 3,284,089 | A * | 11/1966 | Wrenshall | 251/214 |
| 4,169,604 | A * | 10/1979 | Heathcott | 277/529 |
| 4,340,204 | A * | 7/1982 | Herd | 251/214 |
| 4,394,023 | A * | 7/1983 | Hinojosa | 251/214 |
| 4,451,047 | A * | 5/1984 | Herd et al. | 251/214 |
| 4,516,752 | A * | 5/1985 | Babbitt et al. | 251/214 |
| 4,530,469 | A | 7/1985 | Muck | |
| 4,540,157 | A | 9/1985 | Kawanami | |
| 4,566,482 | A | 1/1986 | Stunkard | |
| 4,570,942 | A * | 2/1986 | Diehl et al. | 251/214 |
| 4,587,990 | A | 5/1986 | Pennell et al. | |
| 4,637,421 | A | 1/1987 | Stunkard | |
| 4,944,489 | A | 7/1990 | Adams et al. | |
| 5,232,200 | A | 8/1993 | Combeau | |
| 6,202,668 | B1 * | 3/2001 | Maki | 251/214 |
| 6,725,875 | B2 | 4/2004 | Mollard | |

* cited by examiner

*Primary Examiner* — John Bastianelli
(74) *Attorney, Agent, or Firm* — Ken Dallara; Law Office of Ken Dallara

(57) ABSTRACT

A replaceable valve shaft sealing system is disclosed that enables the operator to greatly reduce the maintenance needs of valves where rotational movement of a shaft, that is connected to the actual metering apparatus of the valve, actuates the opening or closing of the valve thereby regulating fluid flow. The design of the shaft enables the user to replace the valve stem and associated sealing rings or to re-lubricate the shaft, while the valve is connected to the line, by simply removing the packing nut. There are no-preloaded sealing devices that require re-construction. Prior art designs use O-rings to prevent the seepage of fluid into the valve body and though the rotating shaft, but the disclosed shaft prevents contamination of the lubrication into the fluid flow and eliminates any of the axial loads that can cause O-rings to fail using the prior art designs.

10 Claims, 4 Drawing Sheets

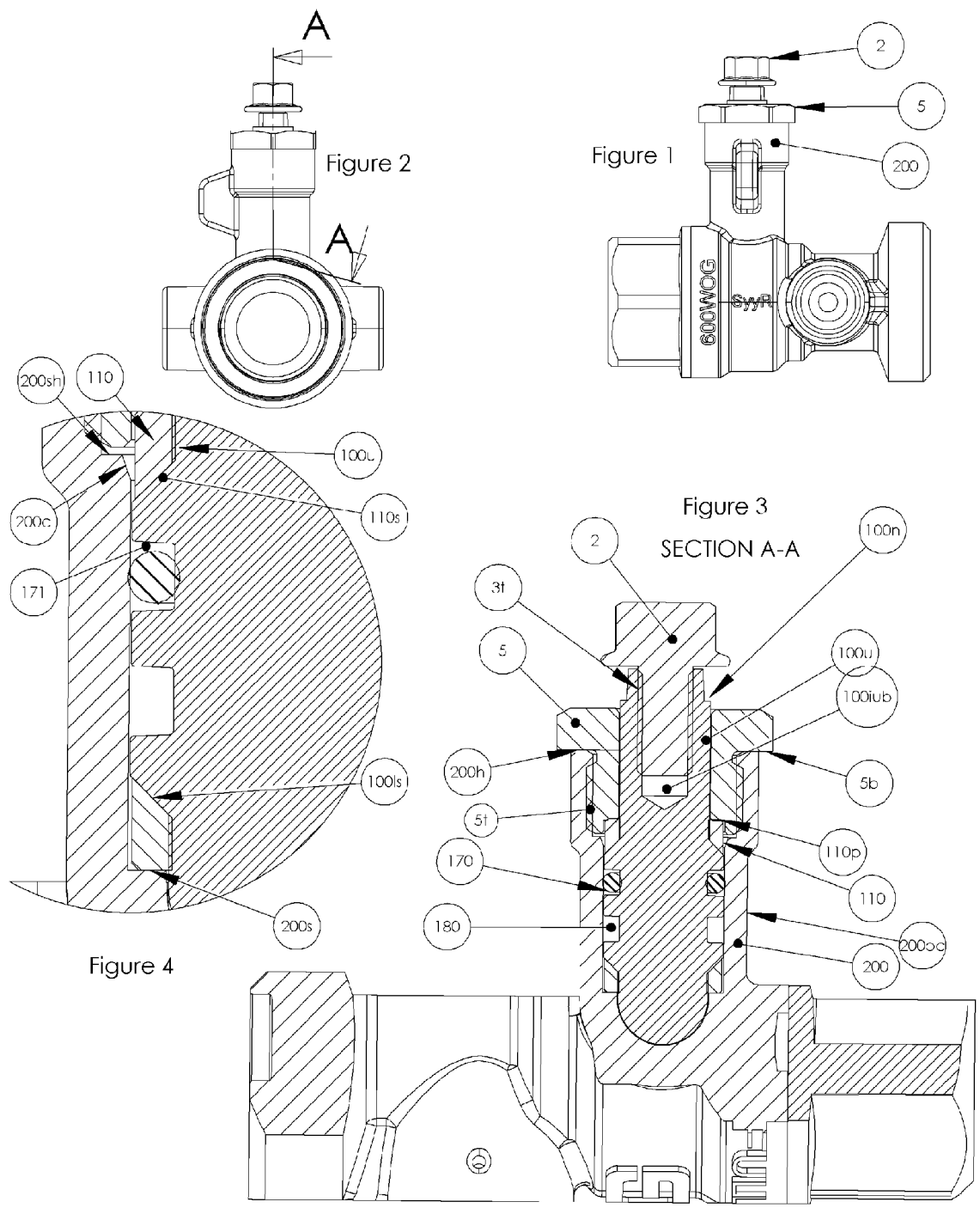

PRIOR ART

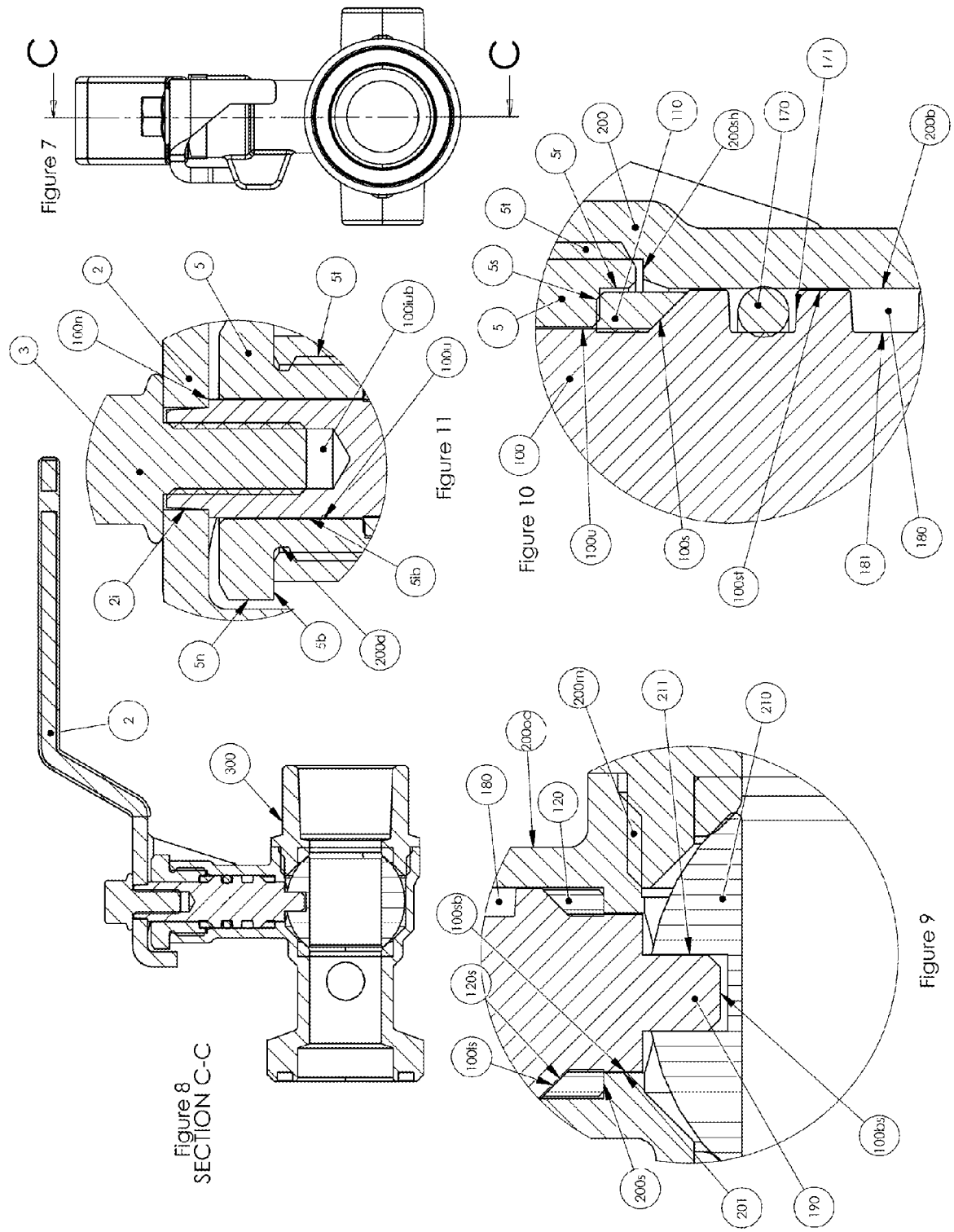

REPLACEABLE VALVE SHAFT SEALING SYSTEM

CROSS-REFERENCES TO RELATED APPLICATIONS

This application incorporates provisional application No. 60/974,674 entitled "Improved Replaceable Valve Shaft Sealing System" filed Sep. 24, 2007 and is co-pending, said incorporation claims all benefits thereof, and is herein incorporated by reference in it's entirety

FIELD OF INVENTION

This field of this invention is those applications where there is an interface, whether manually or mechanical or actuator driven, between a valve and the means used to manipulate the position of the valve in reference to the flow of fluid. The valve can be a ball valve, butterfly valve or any other valve where rotational movement of the controlling interface is rotationally turned to adjust the opening or closing of the orifice of the actual valve.

BACKGROUND OF THE INVENTION

Prior art found in both patented and non-patented arenas find the interface between the means for turning a valve to the desired position and the actual part of the valve that controls the flow of fluids is considered to be a valve stem. This stem is subject to both rotational or torsional loads and axially driven loads such as compression or tension loads. Due to the need for rotational movement and the presence of axial loads, sealing devices that are used to prevent the flow of fluid from escaping the valve through the valve stem are circularly formed, as lip or cupped seals are not adapted to axial loads and square or lathe cut sealing rings are not adapted for rotational loads. Current applications include the use of a lubrication placed thereupon the sealing devices in order to facilitate a lower amount of friction turning rotational movement. Without this lubrication, the sealing members would dry out and deteriorate or bind and twist causing excessive elongation decreasing the amount of sealing area and possibly failure if the elongation is beyond the plastic range of the material. Self-lubricating materials have a lubricity molded or processed during it's formation are often used to facilitate a smoother rotational movement. Unfortunately, these sealing members that can have lubricity built-in are often not chemically inert to handle the presence the fluids that are present in the valve.

Another problem with lubrication, whether being built in to the O-ring or applied during the assembly process, is that it introduces a contamination into the system. Due to the contact of the fluids onto the sealing O-Ring, lubrication is transferred away from the O-Ring to the fluid, thereby contaminating the fluid and possibly introduce chemicals that will affect other sealing members in other valves, control devices or other seals.

Due to existing valve design, one needs to disassemble a valve to replace the o-rings as the current valve design contains a shoulder to prevents dislodgement during axial loads. FIG. 2 shows a current state of the art ball valve, where the valve stem is held captive by the valve body itself. This reduces the axial loads associated with pressure differential and reduces the axial loads on the O-rings themselves. Entrance and Exit Flanges in this case are threaded into the valve body. The valve stem itself is inserted into the valve body prior to the introduction of the actual ball and is assembled internally. Replacement of the valve stem O-rings requires the user to completely remove the valve from the piping system and disassemble it in order to reach the actual O-Rings.

Even with the introduction of lubrication to help increase the life of O-ring sealing members, it is the inherent constructional defect that causes O-ring failure. O-rings are able to be elongated, whereby their cross-sectional area is reduce, and placed onto rotational stems. An O-ring should have an optimal compression of approximately 14% of its cross sectional area in it elongated state. This leads to the need of high tolerance machining of the rotational member and the bore into which it is placed, often below 0.002 of an inch. This is also where the inherent constructional defect is highlighted as O-rings that are in an elongated condition have greatly reduced abilities to seal while being subjected to axial loads which are present due to the fluxuations in pressure, temperature and other environmental variables.

Current prior art has shown a variety of sealing methods including one O-ring, two seals or a seal another oring seal. A single O-ring as shown in U.S. Pat. No. 4,54,157 issued to Kawanami on Sep. 10, 1985 is typical of application where a single O-ring is used in sake of economically producing a device which can be mass marketed can be used in certain kinds of applications where adjustment is rarely accomplished. This O-ring is subjected to temperature extremes which will degrade an O-ring causing failure and subjects the O-ring to chemicals which will also degrade the O-ring until failure occurs. Constant use of the device will also lead to premature O-ring failure for the aforementioned reasons. Two O-ring seals are used to extend the life of the O-rings seals but are doomed to eventual premature failure just as single O-rings are for the aforementioned reasons. U.S. Pat. No. 4,566,482 issued to Stunkard on Jan. 28, 1986 shows a typical use of a dual O-Ring based valve. Constant adjusting of the valve, as such operations are typical in HVAC applications, wear unnaturally on the O-rings of circular cross-sections as disclosed in the patent.

Some inventions temper the wear on the O-rings by introduction of a different style of seal to supplement the O-ring. This is shown on U.S. Pat. No. 4,637,421 issued to Stunkard on Jan. 20, 1987, This valve contains a "precision machined conical surface 92" that interfaces with another "precision machined conical surface 84" to create a seal when "pressure actuated in a direction toward the bonnet". There is also a wedge shaped circular packing that aids in the sealing process. This operation only functions when pressure is applied and will not work in the application where suction forces, caused by rapid pressure loss, such as when a pump is shut down. This is a high precision and costly process that only provides a positive seal when the pressure is sufficient to cause the seal to forcibly come into contact with each other.

What is needed is to have a device whereby O-rings are used that are protected or are isolated from extreme parameters of heat and chemical compositions. It is an object of this invention to produce a valve stem which can be sealed with O-rings of reasonable cost using common materials along with lubrication compounds that can increase the life of O-rings while facilitating a smoother operation of the valve stem with lower torque requirements when subjected by loads of fluid pressure.

What is needed is to reduce the amount of torque necessary to actuate a valve stem, while maintaining a reasonable valve stem height. In this invention, it is recognized that when an O-ring is subjected to unequal side loads, the O-Ring can "bind" in the area of greatest side load causing the O-Ring to fail. It is an object of this invention to create a device whereby the valve stem is pre-positioned using angularly shaped solid wedges, which prior to and during load, will center the valve stem in it's preferred path, whereby allowing the O-Ring not to be subjected to the entire amount of the side, extension or compression loads to be subjected upon the valve stem during normal operations. This pre-load will also reduce the amount of torque necessary as the O-ring will not have the opportunity to bind along the sidewalls causing undue frictional components to the rotational movements.

What is needed is a valve stem that does not rely on O-rings as the method of sealing, yet creating a valve stem that is economically viable. It is a further object of this invention to use pre-loaded wedged packing seals, which will allow for a seal against intrusion of fluid into the valve stem. This seal will also thereby prevent escapement of lubricating compounds into the fluid flow preventing contamination, and allows for the use of more resilient lubricating compounds.

What is needed is a design of the valve stem whereby it can be replaced in the field without complete disassembly of the valve. It is a further object of this invention to create a replaceable valve stem where a minimal amount of tools are necessary and repeatability of adequate seal can be repeated with positive feedback of proper assembly. The presence of a lead-in chamfer which guides the stem into the housing prevents the O-rings from being cut or pinched by the straight sides commonly found.

What is needed is a valve stem can be economically produced without the need for critical tolerancing that causes excessive costs. It is an object of this invention that due to the ability to use materials that are chemically inert in critical areas in shapes conducive to rotational movement, this allows for lower tolerancing of the valve stem components. Due to lower tolerancing, the composition of valve stem materials, having slightly different thermal coefficients, can be replaced into the same valve housing, adapting to different environmental variables.

What is also needed is a valve stem that can seal in both applications where compressional and tensional forces can be exhibited in the piping system. It is an object of this invention to create a device whereby the valve stem has seals that will prevent the intrusion of fluids during periods of increasing pressure or decreasing pressure, where suction or vacuum effect create a tensional force pulling the valve stem down. This device also seals during the side loads experienced by large volumes in fluid flow.

These objects are accomplished by the disclosure and the description herein contained in the patent disclosure.

BRIEF DESCRIPTION OF THE DRAWING FIGURES

Drawing sheet number 1 contains FIG. 1 through FIG. 4.

FIG. 1 is a front elevation of a typical ball valve where the handle of the ball valve is removed for clarification and FIG. 2 is a side elevation detailing an aligned cross-sectional cut A-A.

FIG. 3 is a front elevation that is cross-sectioned along A-A to detail the interior of the housing.

FIG. 4 is a detail of the left side of FIG. 3 to enlarge the view of the sealing and lubrication areas.

FIG. 7 is a side elevation of a ball valve unit with a cross-sectional cut described as C-C.

FIG. 8 is a frontal view of the cross-section unit where 3 detail views have been taken. FIG. 8 also has the handle shown for reference.

FIG. 9 is a detail view of the lower portion of the shaft, and

FIG. 11 is a detail view of the upper portion of the shaft and the interface with the handle.

FIG. 10 is a detail view of the sealing and lubricating members.

DETAILED DESCRIPTION OF THE INVENTION

Figure 5:
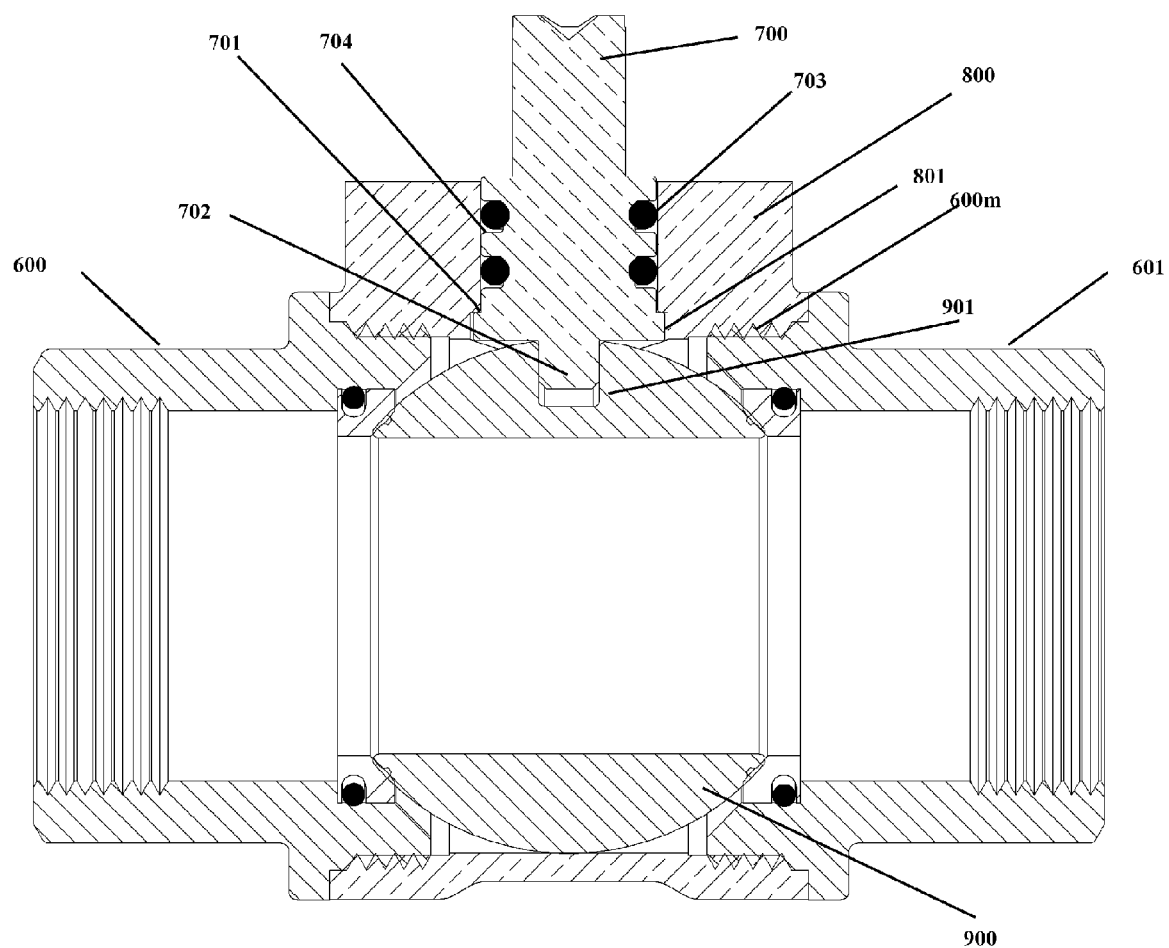
FIG. 5 is a cross-sectional view of a prior art ball valve.
Figure 6:
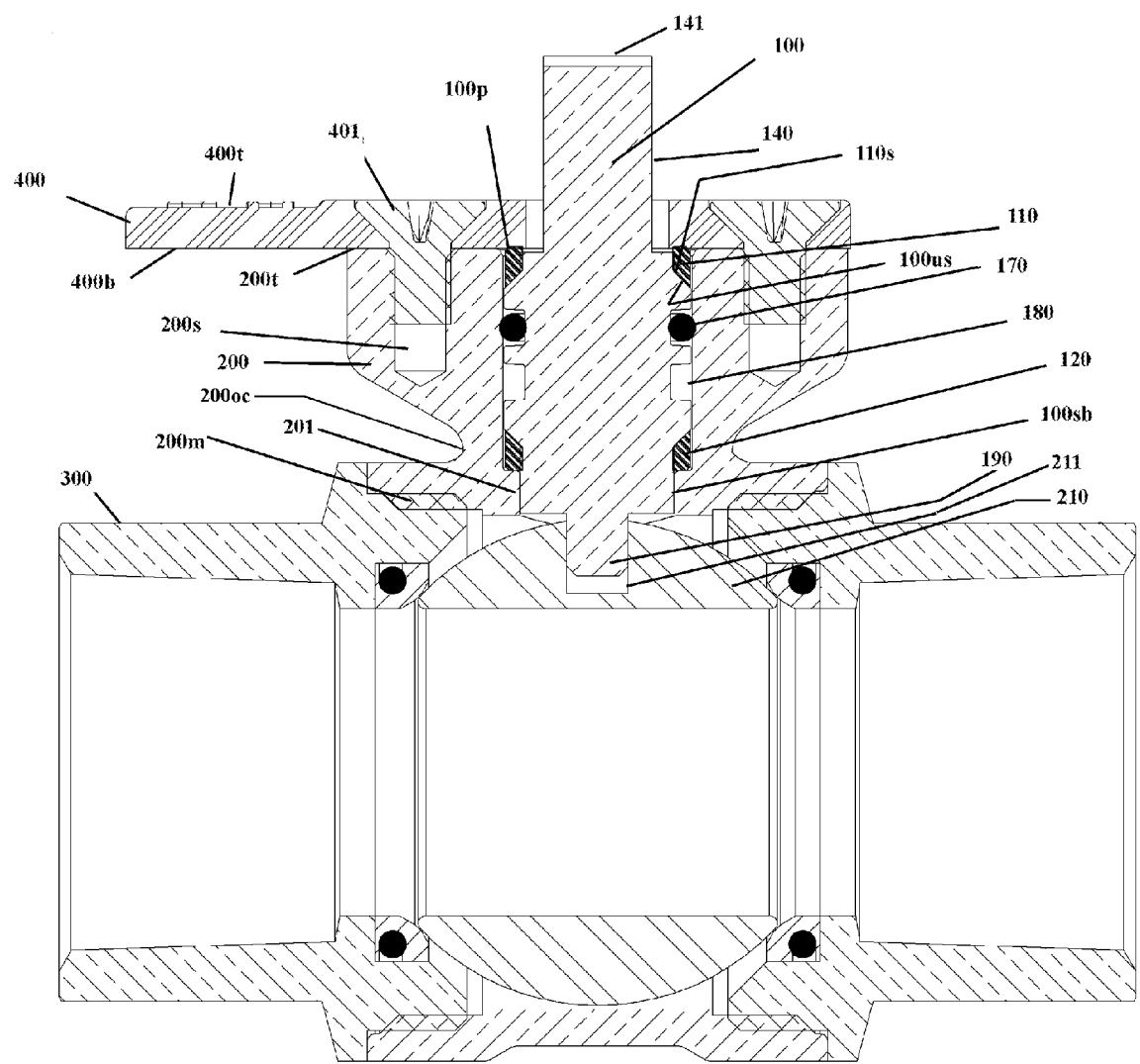
FIG. 6 shows the application where the interface with the improved valve is an actuator style of interface where the packing nut is replaced by a plate.

FIG. 3 shows the improved valve stem in an application in a ball valve assembly. Improved valve stem 100 is coaxially presented into housing 200 through an opening at the distal end of housing 200$d$. Distal end 200$d$ accommodates both valve stem 100 and packing nut 5 along a common central vertical axis. Valve stem 100 is introduced into the lower bore 200$b$ by proceeding past chamfer 200$c$ which creates a smooth lead-in into bore 200$b$ preventing problems of damage to O-rings and other pieces often caused by sharp corners edges during the assembly, dis-assembly and re-assembly of the stem into the housing. Distal end 200$d$ terminates at flat top 200$t$. Nut 5 has an outer bore 5$n$ which is contoured to accept any range of acceptable tightening devices, in this invention a hex shaped outer bore was used to accept a wrench. Nut 5 also has an inner bore 5$ib$ which is defined in size to accept therethrough the outer bore of the upper portion of valve stem 100$u$ with a tolerance described as a running fit or medium fit of liberal allowance, designed to allow for rotational interface without interference. Nut 5 has threads 5$t$ which rotatably mate with housing threads 200$m$. Threads are of such type, and are designed to have a length that, lower portion of nut 5$b$ will contact top of distal end of housing 200$t$ providing tactile feedback that nut 5 is in the proper location. Nut 5 will not touch shelf 200$sh$ but is calculated to maintain a gap sufficient to allow for thermal expansion of the materials present.

Distal end of nut 5, which is circular in nature, contains wedge pre-load interface 5$s$ which is circumferentially in communication with, and is critically dimensioned to be able to exert a constant pressure upon, upper wedge seal 110, pressure thereupon directed along the vertical axis of stem 100 contained by circular retaining wall 5$r$ that prevents horizontal displacement of the wedge during compression. Proximal edge of wedge 110$p$ will be compressed by interface 5$s$ in such a manner as there will be an interference fit in a sufficient amount to create a cold flow of material stabilized within the cavity created by interface 5$s$, retaining wall 5$r$, upper portion of valve stem 100$u$ and stem slope 100$s$. Distal end of wedge 110, opposite and on the same axis as proximal edge 100$p$, is angularly inclined and is mated along, and is also in circumferentially in contact with, a similarly inclined slope stem 100$s$. Stem slope 100$s$ emanates outwardly from the central axis of stem 100, is circumferentially related to stem 100, and in this invention slopes in an angle obtuse to the center line axis of stem 100. Inner bore of 110 is designed to allow for a interference with stem bore 100$u$ sufficient to prevent dislodgement of the wedge during assembly but not so much as to create a hindrance during assembly, tolerancing of this fit is dictated by the lubricity of the wedge's material composition, surface finish of the inner bore of the wedge, ground roughness of the outer stem bore and presence of external lubrication designed to facilitate easy assembly. In this invention, the wedge material consists of a Teflon impregnated polymer material.

The diameter of outer stem bore 100$st$ is such as to create a running fit, whereby stem 100 is allowed to rotate with minimal interference against housing inner bore 200*b*. Surface finishes of bore 100*st* and bore 200*b* should be similar to reduce the chance of friction.

Extending toward base of stem 100*bs*, located adjacent to slope 100*s* is O-ring groove 171 circumferentially described by a recess cut into and creating an indentation perpendicular to the vertical axis of stem 100, have 2 equilateral walls and a bottom designed to capture O-ring 170, walls being cut to a depth that will allow the O-ring to protrude approximately 7-14% of it's cross-sectional diameter dimension greater than that of the diameter stem outer bore 100*st*.

Extending more toward base of stem 100*bs*, located adjacent to O-ring groove 171 is lubrication reservoir 180 which is a second circumferentially described recess cut into and creating an indentation perpendicular to the vertical axis of stem 100, have 2 equilateral walls. Depth of reservoir 180 is sufficient to contain lubrication necessary for the particular composition of the O-ring along with the consideration of the expected operating environment to be expected where the valve will be placed.

Located is a position below that of reservoir 180 is the second sealing wedge 120 having a outer diameter and an inner diameter dimension. Wedge 120 is contained by a recess cut into bore 100*st* with an angularly inclined slope 100*ls* emanating from the recess to the diameter of bore 100*st* at an acute angle to that of the vertical axis of stem 100. The angle of 100*ls* is duplicated on the wedge 120 inclined slope 120*s*. Wedge 120 is captured in the vertical plane by shelf 200*s* whereby causing an interference fit between wedge 120 and shelf 200*s* caused by the force imparted by slope 120*s*. Wedge 120 is composed of a material that has a degree of compressibility yet has a wear characteristic and chemical resistance necessary for the application. In this invention, a Teflon impregnated polymer is used. The inside diameter of wedge 120 is such as to create a slight interference fit so as to aid in the assembly of the stem into the housing.

Stem step 100*sb* is shaped to match the configuration of housing lower bore 201 whose fit is classified as a running fit which allows rotational movement with a minimal frictional component. The distal end of stem bore 100*bs* terminates in tang 190 which is the interface between the instrument that direct regulates the flow of fluid and the stem itself. In this drawing figure, stem 100 is part of a ball valve therein tang 190 interfaces with the receiving slot 211 in ball 210.

Proximal end of stem 100 is the interface between the stem and the component that will directly operate the valve visa vie the stem. In FIG. 1, a manually operated handle 2 is attached to the proximal end of stem 100 using bolt 3 to secure handle 2 onto step 100*n*. Step 100*n* is shaped as to interface with handle interface 2*i*, which in this invention is a hex shaped pattern. Step 100*n* is recess into the proximal end of stem 100 to allow for the interface and serves as the compression point to capture handle 2 using bolt 3. Bolt 3 is threadably interfaced with the proximal end of stem 100 through threaded internal bore 100*iub*, having matching thread to accept the bolt threads 3*t*.

FIG. 3 details the interface of stem 100 with an actuator style of valve operation. The proximal end of stem 100 has an actuator interface 140 which is terminated by slot 141. Actuator plate 400 is define by a top surface 400*t* and a lower surface 400*b*. Housing 200 is similar to that that described in FIG. 1 and stem 100 contains all of the features as described in FIG. 1 with the addition of interface 140. Plate 400 is directly secured to housing 200 using threaded bolts 401. When threaded bolts 401 are completely tightened into threaded recesses 200*s* there will be a complete contact between housing surface 200*t* and lower surface 400*b*. Complete tightening of bolts 401 will also cause an interference between lower surface 400*b* and wedge 110 causing wedge 110 to experience a cold flow condition. Piping couplings 300 are located at the entrance and exit of the valve.

Disassembly of the valve stem from the housing is accomplished by relieving that component that is creating the compression upon the wedge 110. In FIG. 1, where it is a manually operated valve, remove of handle 2 from stem 100 is accomplished and nut 5 is rotatably removed from housing 200. Stem 100 is completely free to be removed. In FIG. 3, where an actuator is attached to the valve housing, remove of actuator plate 400 exposes stem 100 to be removed and replaced. It can be seen from FIG. 2, that current prior art valves having dual O-rings are constructed internally hereby stem 700 is inserted into housing 800 through the internal bore of housing 800 having a stem shoulder stop 801 which interfaces with stem step 701. O-Rings 703 provide sealing from the intrusion of fluid that is present.

It is obvious that one skilled in the art can combine this device with applications other than piping systems and into applications where any kind of device where rotational adjustment means are necessary. It is within the spirit and scope of this application to include such applications of wedge shaped seals that are pre-loaded to a cold flow condition are used in combination with an O-ring for additional sealing and to facilitate rotational movement. The advent of the inclusion of a lubrication reservoir is an added benefit to be used at the pleasure of the operator.

What is claimed is:

1. An Improved Replaceable Valve Shaft Sealing System that is adaptable to a valve stem that acts as the interface between an actuator and the valve orifice member, comprised of the elements;

a valve shaft, having a proximal end containing a valve orifice interface and a distal end containing an actuator interface means and a sealing section that is terminated circumferentially at the upper end of said sealing section by an upper angularly inclined sealing gland ledge, and is terminated circumferentially at a lower end of said sealing section by a lower angularly inclined sealing gland ledge, said sealing section also designed to facilitate at least one sealing member and a lubrication reservoir, two angularly inclined sealing glands, each said gland is polygonal in shape containing at least one angled side that is congruent to each respective upper and lower said angularly inclined sealing gland ledges, said glands are in circumferential communication with said gland ledges, a compression inducing member designed to interface with said actuator interface means, said compression inducing member designed to create a compressive force onto said angularly inclined sealing gland, and a valve shaft housing having an interior bore and an external circumference, an upper end coinciding with said actuator interface means and a lower end coinciding with said valve orifice interface, said internal bore designed to allow for the incorporation of the said valve shaft thereinto through a chamfered opening, located near said upper end of said housing, and said distal end adapted to supply the means for attachment of said compression inducing member and said upper end of said housing providing a positive stop to the advancement of said compression inducing member.

2. An Improved Replaceable Valve Shaft Sealing System as in claim 1 where said distal end of said valve shaft incorporates said valve orifice interface and said proximal end incorporating said actuator interface means, and a sealing area located therebetween.

3. An Improved Replaceable Valve Shaft Sealing System as in claim 2 where said actuator interface means is the coupling of said valve shaft to the actuator, said actuator is selected from the grouping containing a manual handle and a self-propelled actuator.

4. An Improved Replaceable Valve Shaft Sealing System as in claim 2 where said actuator is a manual handle, said compression inducing member is an externally threaded nut interfacing with said distal end of said housing through an internally threaded means, said nut having an internal bore, capable of interfacing with said valve shaft and an external gripping surface for interface with tightening means, said external gripping surface having a greater outside diameter than that of said circumference of said housing, and said actuator interface means is an internally threaded multiple sided step.

5. An Improved Replaceable Valve Shaft Sealing System as in claim 2 where said actuator is a self-propelled actuator, said compression inducing member is an actuator adaptor plate interfacing with said distal end of said housing through multiple threaded means located thereupon said distal end, said plate having an internal bore capable of interfacing with said valve shaft and said actuator interface means is an multiple sided step adapted to interfacing with particular actuators mechanical turning means.

6. An Improved Replaceable Valve Shaft Sealing System as in claim 1 where said angularly inclined sealing gland is a ring shaped gland with an inner diameter and an outer diameter and contains a height and a width component, angularly inclined face of said upper sealing gland is coincident to inclined face of upper end of said sealing section and angularly inclined face of said lower sealing gland said coincident to inclined face of lower end of said sealing section, the area of said proximal flat is equivalent to the width of said glands.

7. An Improved Replaceable Valve Shaft Sealing System as in claim 1 where said lubrication reservoir and said sealing member is located circumferentially along said valve shaft between said upper end and said lower end.

8. An Improved Replaceable Valve Shaft Sealing System as in claim 6 where said height of said angularly inclined sealing glands is such as to create an interference fit between said compression inducing member and said upper sealing gland, whereby when said compression inducing member ceases downward travel at said positive stop, said sealing glands are compressed.

9. An Improved Replaceable Valve Shaft Sealing System as in claim 6 where said outer diameter of said sealing gland is without interference in relation to said interior bore of said housing prior to engagement of said compression inducing member, and said inner diameter of said sealing gland has a circumferential close fit to said valve shaft.

10. An Improved Replaceable Valve Shaft Sealing System as in claim 1 where said sealing member is selected from the grouping containing a circular cross-sectioned O-Ring, a square-cut O-Ring and Lip seals.

* * * * *